United States Patent [19]

Kuroishi et al.

[11] Patent Number: 5,034,425

[45] Date of Patent: Jul. 23, 1991

[54] RIGID POLYURETHANE FOAM, PROCESS FOR PRODUCING THE SAME, AND HEAT INSULATORS AND REFRIGERATORS USING SUCH POLYURETHANE FOAM

[75] Inventors: Kazuyoshi Kuroishi; Reishi Naka; Isao Kobayashi, all of Tochigi, Japan

[73] Assignee: Hitachi, Ltd., Tokyo, Japan

[21] Appl. No.: 420,475

[22] Filed: Oct. 21, 1989

[30] Foreign Application Priority Data

Apr. 27, 1989 [JP] Japan .................................. 1-105925

[51] Int. Cl.$^5$ ............................................. C08G 18/14
[52] U.S. Cl. .................................... 521/131; 521/159; 521/175
[58] Field of Search ......................... 521/131, 159, 175

[56] References Cited

U.S. PATENT DOCUMENTS 4,230,824 10/1980 Nodelman .......................... 521/175

*Primary Examiner*—Maurice J. Welsh
*Attorney, Agent, or Firm*—Antonelli, Terry, Stout & Kraus

[57] ABSTRACT

A rigid polyurethane foam produced by reacting a special polyol component with an isocyanate component in the presence of a blowing agent containing water in an amount of 2 to 3.5% by weight per 100% by weight of the polyol component is excellent in fluidity with balanced excellent properties.

11 Claims, 1 Drawing Sheet

FIG. 1A
FIG. 1B
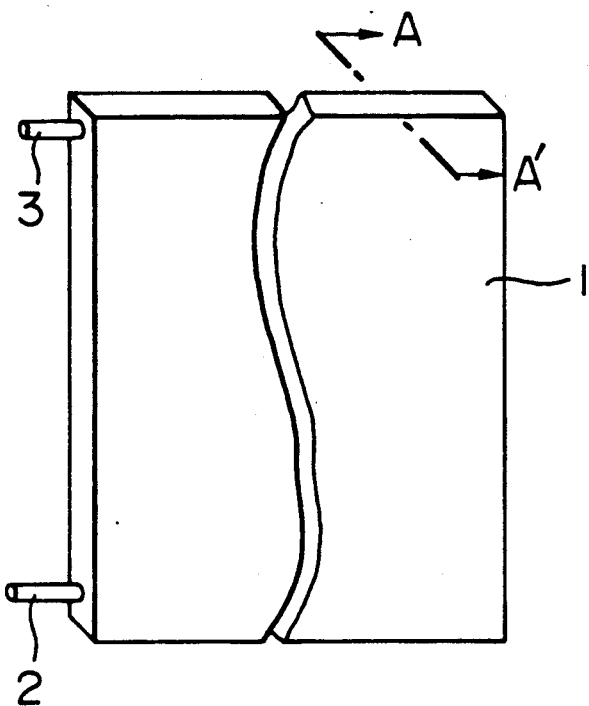
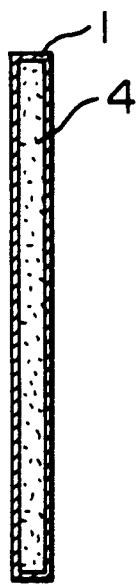
FIG. 2
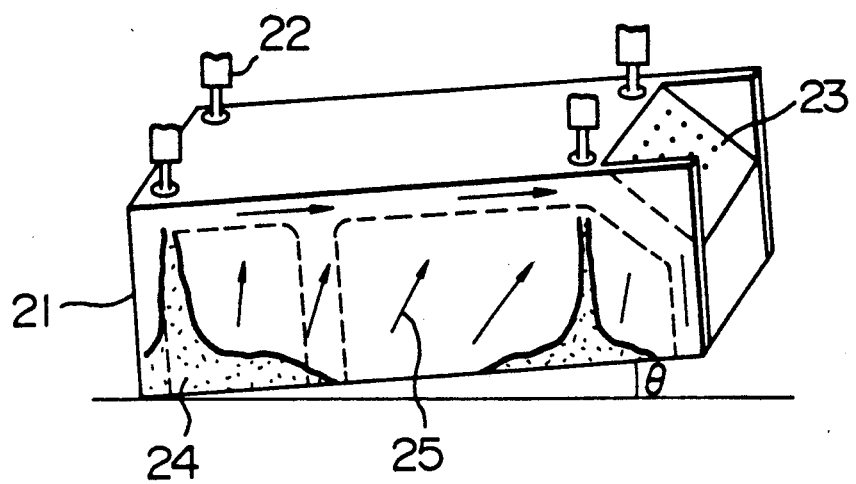

RIGID POLYURETHANE FOAM, PROCESS FOR PRODUCING THE SAME, AND HEAT INSULATORS AND REFRIGERATORS USING SUCH POLYURETHANE FOAM

BACKGROUND OF THE INVENTION

This invention relates to a closed-cell rigid polyurethane foam having a remarkably low density as well as a low thermal conductivity and also well balanced in its various properties, a process for producing such polyurethane foam, and use thereof for heat insulators and refrigerators.

Rigid polyurethane foams are usually obtained by reacting a polyol component and an isocyanate component in the presence of a blowing agent, a reaction catalyst and a foam stabilizer. Since closed-cell rigid polyurethane foams are generally excellent in heat insulating properties, they are widely used as various kinds of heat insulating materials. Request is strong, however, for those polyurethane foams which are lower in density, smaller in thermal conductivity and better in moldability than those hitherto available. Various proposals have been made to improve these matters.

Blowing agent exerts a great influence on formation of closed cells and properties of foams and should be given a serious consideration in its use and treatment. Among the blowing agents generally used, chlorofluorocarbon (CFC), which is hardly decomposable, is attracting attention as its accumulation in the atmosphere could lead to destruction of the ozone layer and world-wide discussions are being made for restricting use or even production of this compound. Under such circumstances, measures against use and treatment of this compound are urgent.

It has long been known in the art that water is usable as a blowing agent. For example, Japanese Patent Application Kokai (Laid-Open) No. 53-9797 proposes use of a fluorochlorinated hydrocarbon and water (0.2 to 3 parts by weight per 100 parts by weight of polyol component) as a blowing agent. It is stated that, in this case, the amount of water usable for the composition is subject to certain limitations since use of an excess amount of water not only leads to consumption of polyfunctional isocyanate component to cause a poor economy but also notably reduces flexibility of the produced foam while also deteriorating the heat insulating properties. Use of water, however, had a serious problem in that its use even in a small amount could cause deterioration of heat insulating properties or formation of gas boils in the product, resulting in unbalance of the properties required for a rigid urethane foam.

For maintaining a good balance of properties, use of a combination of specific polyol components is proposed in Japanese Patent Application Kokai (Laid-Open) No. 59-84913, but as regards the blowing agent, it is simply mentioned that trichloromethane and water are usable, with no reference being made to the amount of water to be used. Further, in Japanese Patent Application Kokai No. 62-81414, it is stated that water used for the blowing agent exerts no influence on thermal conductivity if the amount of water used is less than 1% by weight in trichlorofluoromethane, and it is rather helpful for maintaining appropriate fluidity even when the mold temperature is low. This proposal is no more than a reconfirmation of the old concept that the desired properties cannot be obtained unless the amount of water used is as small as less than 1% by weight in the blowing agent. This reflects the present state of technology in this field of art.

SUMMARY OF THE INVENTION

It is therefore an object of the present invention to provide a rigid polyurethane foam having a remarkably low density as well as a low thermal conductivity and also well balanced in various properties notwithstanding use of a specified amount of water for notably improving fluidity.

Another object of this invention is to provide a process for producing such a rigid polyurethane foam, heat insulators using said foam, and practical application thereof to refrigerators.

The present invention provides a rigid polyurethane foam obtained by reacting a polyol component and an isocyanate component in the presence of a blowing agent containing water, said polyol component being a mixed polyol composition comprising
(a) 47 to 53% by weight of a polyol obtained by adding propylene oxide and/or ethylene oxide to sucrose,
(b) 13 to 17% by weight of a polyol obtained by adding propylene oxide and/or ethylene oxide to propylene glycol,
(c) 8 to 12% by weight of a polyol obtained by adding propylene oxide and/or ethylene oxide to diethanolamine, and
(d) 23 to 27% by weight of a polyol obtained by adding propylene oxide and/or ethylene oxide to tolylenediamine, said isocyanate component being a mixed isocyanate composition comprising
(A) 70 to 90% by weight of polymethylene polyphenyl diisocyanate, and
(B) 10 to 30% by weight of sucrose tolylene diisocyanate, the amount of water contained being 2 to 3.5% by weight based on 100% by weight of polyol component.

This invention further provides a process for producing said rigid polyurethane foam, heat insulators using said foam, and use thereof for refrigerators.

BRIEF DESCRIPTION OF THE DRAWINGS

FIG. 1(a) is a perspective view of a hollow casing used for producing a heat insulator.

FIG. 1(b) is a sectional view taken along the line A—A'.

FIG. 2 illustrates a packed state of rigid polyurethane foam in an outer case of a refrigerator.

DESCRIPTION OF THE PREFERRED EMBODIMENTS

The present invention is characterized by using as blowing agent a prescribed amount of water and at least one of specified organic chlorofluorine type blowing agents, and a combination of a specific mixed polyol composition and a specific mixed isocyanate composition. The rigid polyurethane foam obtained by using said materials in specified combination according to this invention is well balanced in properties in spite of use of water in an amount which appears to be too much in the light of conventional concept, and such foam finds very useful application to refrigerators and the like.

More definitely, the rigid polyurethane foam obtained according to this invention is typified by the fact that its density can be as low as 22 kg/m$^3$ or less, preferably 19 to 21 kg/m$^3$ in terms of free foam density, the thermal conductivity can be maintained at $15.0 \times 10^{-3}$ kcal/m.hr.° C. or less, preferably 13.0 to $14.0 \times 10^{-3}$ kcal/m.hr.° C., the rate of low-temperature dimensional change can be kept at $-3\%$ or less, preferably $-1\%$ or less, the compressive strength can be raised to 0.8 kg/cm$^2$ or above, preferably 0.9 kg/cm$^2$ or above, and the mold release time can be shortened to 6 minutes 1 or less, preferably 5 minutes or less. Further, by use of a specified amount of water, it is possible to markedly enhance fluidity of the composition in the course of molding without lowering the desirable property values of the rigid polyurethane foam.

The "fluidity" referred to in the specification of this invention is defined as follows:

$$\text{Fluidity} = \begin{pmatrix} \text{foam density after} \\ \text{cast into mold for} \\ \text{molded article} \end{pmatrix} - \begin{pmatrix} \text{free foam} \\ \text{density} \end{pmatrix} \quad (1)$$

The mold for a molded article refers to, for instance, an outer case of a refrigerator such as shown in FIG. 2 in case the foam of the present invention is to be used for a refrigerator. Density of the foam obtained by foaming the composition by placing it in an actually used mold is naturally different from free foam density obtained when the composition is foamed by placing it in a top-opened container by way of test. In this case, the smaller the difference therebetween, the better is the fluidity. When the value obtained from the above formula (1) is 10 kg/cm$^3$ or less, it is considered that the foam has good fluidity. On the other hand, when said value is 12 kg/cm$^3$ or above, the foam is rated as poor in fluidity.

Good fluidity makes it possible to attain the intended object by use of a smaller amount of materials and thus greatly contributes to the material cost reduction in industrial production. Also, in the present invention, because of use of water, the cells of the foam are made finer, producing the effect of maintaining a low thermal conductivity.

Further, use of 1 part by weight of water matches the use of 10 parts by weight of an organic chlorofluorine type blowing agent, so that the present invention has an additional advantage that by using water in a relatively large amount, there can be realized a reduction of cost for blowing agent and alleviation of pollution problem resulting from use of an organic chlorofluorine type blowing agent.

Hitherto, trichloromonofluoromethane has been used in great quantities as blowing agent. This substance is one of hardly decomposable CFC's. It is said that when this substance is released into the atmosphere, it acts to destroy ozone layer in the stratosphere or causes rise of earth surface temperature due to so-called greenhouse effect. Thus, use of this substance is hotly debated as a global environmental pollution problem in recent years.

In the conventional methods of production of rigid polyurethane foams, it was necessary to use trichloromonofluoromethane in an amount of 45 parts by weight or more per 100 parts by weight of polyol component. According to the process of this invention, however, the amount of said substance to be used in the composition can be reduced to less than 40 parts by weight, or it is even possible to obtain a rigid polyurethane foam having the desired properties without using said substance at all. This is quite a surprising effect of the present invention.

The mixed polyol composition used as polyol component in the present invention comprises
(a) 47 to 53% by weight of a polyol obtained by adding propylene oxide and/or ethylene oxide to sucrose,
(b) 13 to 17% by weight of a polyol obtained by adding propylene oxide and/or ethylene oxide to propylene glycol,
(c) 8 to 12% by weight of a polyol obtained by adding propylene oxide and/or ethylene oxide to diethanolamine, and
(d) 23 to 27% by weight of a polyol obtained by adding propylene oxide and/or ethylene oxide to tolylenediamine, wherein the sum of (a) + (b) + (c) + (d) is 100% by weight and preferably the composition has an average OH value of 380 to 410.

When the amount of any of the components (a) to (d) is outside the specified range, there can not be obtained a rigid polyurethane foam having the wellbalanced properties in relation to the amount of water used.

In the mixed polyol composition, it appears that the component (a) is effective for improving lowtemperature dimensional stability, compression strength and mold releasability, the component (b) is effective for improving fluidity and compatibility, the component (c) is effective for bettering fluidity, and the component (d) is effective for improving thermal conductivity.

It is to be noted that when the average OH value of the mixed polyol composition is less than 380, the low-temperature dimensional stability may be lowered, while when the average OH value exceeds 410, the friability may readily take place. Accordingly, the preferred range of average OH value is 380 to 410 for producing a rigid polyurethane foam with stabilized properties. The polyol components mentioned above can be synthesized by conventional processes.

As the isocyanate component reacted with said mixed polyol composition in the present invention, there is used a mixed isocyanate composition comprising
(A) 70 to 90% by weight of polymethylene polyphenyl diisocyanate, and
(B) 10 to 30% by weight of sucrose tolylene diisocyanate, the sum of (A) +(B) being 100% by weight. This mixed isocyanate composition preferably has an average NCO percent of 31 to 33%.

By using a mixed isocyanate composition comprising said components (A) and (B) in the abovespecified proportions, it is possible to improve fluidity without affecting the mold releasing properties. Further, use of said mixed isocyanate composition can realize an improvement of skeleton strength of the foam and a betterment of low-temperature dimensional stability when the foam is reduced in density. It should be noted that when the NCO percent of the mixed isocyanate composition is less than 31%, the fluidity is lowered, and when the NCO percent exceeds 33%, the low-temperature dimensional stability is deteriorated. It is therefore desirable to use an isocyanate composition having an NCO percent of 31 to 33% for producing a rigid polyurethane foam with stabilized properties. The isocyanate components mentioned above can be synthesized by conventional methods.

When any of the components of said polyol composition and said isocyanate composition reacted therewith is outside the above-specified range in proportion, the object of the present invention cannot be attained.

The reaction ratio of the isocyanate component to the polyol component is preferably 1.00 to 1.20, more preferably 1.10, in terms of the ratio of NCO of isocyanate to OH of polyol, viz. NCO/OH.

Considering such property factors as foam density, thermal conductivity, low-temperature dimensional stability, fluidity and mold releasing properties, the combination of the following polyol composition and isocyanate composition is the most preferred. Polyol composition:
(a) 50% by weight of a polyol obtained by adding propylene oxide and ethylene oxide to sucrose,
(b) 15% by weight of a polyol obtained by adding propylene oxide and ethylene oxide to propylene glycol,
(c) 10% by weight of a polyol obtained by adding propylene oxide to diethanolamine, and
(d) 25% by weight of a polyol obtained by adding propylene oxide and ethylene oxide to tolylenediamine, the average OH value of the polyol composition being 400.

Isocyanate composition:
(A) 80% by weight of polymethylene polyphenyl diisocyanate, and
(B) 20% by weight of sucrose tolylene diisocyanate prepolymer, the average NCO percent of the isocyanate composition being 32%.

The rigid polyurethane foam according to this invention can be obtained by reacting said polyol component with isocyanate component as basic starting materials in the presence of a blowing agent, a reaction catalyst and a foam stabilizer.

As the blowing agent, there can be used water in an amount of 2 to 3.5 parts by weight per 100 parts by weight of polyol components, and an organic chlorine compound such as methylene chloride and an organic chlorofluorine type blowing agent. As the organic chlorofluorine type blowing agent, there can be used hydrochlorofluorocarbons (HCFC) which are not in the list of substances under regulation in use. It is also possible to use a mixture of HCFC and trichloromonofluoromethane which may be mixed in an appropriate ratio. Examples of HCFC usable as blowing agent in this invention are 1,1-dichloro-2,2,2-trifluoroethane, 2,2-dichloro-2-monofluoroethane and 2-monochloro-2,2-difluoroethane. These compounds can be used either singly or in combination. 1,1-dichloro-2,2,2-trifluoroethane is the most preferred. An organic chlorofluorine type blowing agent can be used in an amount of preferably 20 to 70 parts by weight, more preferably 30 to 60 parts by weight, per 100 parts by weight of polyol component.

In case of using trichloromonofluoromethane, it is used in an amount less than 40 parts by weight, e.g., 25 to 37 parts by weight, per 100 parts by weight of polyol component. Even if this compound is not used, the obtained rigid polyurethane foam is unchanged in its properties. This fact is of great significance in terms of prevention of atmospheric pollution, especially prevention of destruction of ozone layer in the stratosphere, since trichloromonofluoromethane has been used in an amount of more than 45 parts by weight in the conventional production of rigid polyurethane foams.

When the amount of water used as blowing agent is less than 2 parts by weight per 100 parts by weight of polyol component, the low-temperature dimensional stability and compression strength are lowered in the low-density region, and when it exceeds 3.5 parts by weight, there results a marked deterioration of thermal conductivity and mold release properties, so that in both cases the object of the present invention can not be achieved. It is therefore essential to adjust the water amount to 2 to 3.5 parts by weight for obtaining a rigid polyurethane foam having well-balanced properties.

As the reaction catalyst, there can be favorably used tertiary amines such as tetramethylhexamethylenediamine, trimethylaminoethylpiperadine, pentamethyldiethyltriamine, triethylenediamine and the like. Such a tertiary amine may be used in combination with a tin compound or the like. In the present invention, the catalyst is used in an amount of 1 to 6 parts by weight, preferably 2 to 4 parts by weight, per 100 parts by weight of polyol component.

As the foam stabilizer, there can be used conventionally used organic silicone compounds, fluorine-containing surface active agents, etc. The foam stabilizer is used in an amount of preferably 0.5 to 5 parts by weight, more preferably 1.5 to 3 parts by weight, per 100 parts by weight of polyol component.

The composition for producing rigid polyurethane foams may further contain one or more conventional additives such as fire retardants, fillers, reinforcing fibers, colorants, etc.

Rigid polyurethane foams can be produced by a one-shot process, semi-prepolymer process, prepolymer process, spray process and other suitable methods. Among them, the one-shot process is preferred.

Foaming can be carried out by using a conventional foaming machine, for example, Model PU-30 manufactured by Promat AG. Foaming conditions slightly vary depending on the kind of foaming machine used but usually are as follows:

| liquid temperature: | 18–24° C. |
| pouring pressure: | 80–150 kg/cm$^2$ |
| pouring amount: | 15–30 kg/min |
| mold temperature: | 35–45° C. |

More preferable foaming conditions are as follows:

| liquid temperature: | 20° C. |
| pouring pressure: | 100 kg/cm$^2$ |
| pouring amount: | 25 kg/min |
| mold temperature: | 40° C. |

The thus produced rigid polyurethane foams have a remarkably low density of 19 to 21 kg/m$^3$ in terms of free foam density and maintain a thermal conductivity of the order of $15.0 \times 10^{-3}$ kcal/m.hr.° C., particularly 13.0 to $14.0 \times 10^{-3}$ kcal/m.hr.° C. Also, the rate of low-temperature dimensional change can be kept below $-1\%$, the compression strength above 0.9 kg/cm$^2$ and the mold release time within 6 minutes, particularly within 5 minutes. Thus, the rigid polyurethane foams provided according to this invention are very excellent as a heat insulator used for refrigerators. They are also useful as a heat insulator for other electric machines, building structures, vehicles, etc., or as heat insulating molded articles. In addition to use as a heat insulator, the rigid polyurethane foams according to this invention can be effectively used as a material for various types of buoyant articles such as buoys for fishery by making use of their small specific gravity and rigidity.

The present invention will be illustrated in further detail hereinbelow by showing the examples thereof in comparison with comparative examples. In the Examples and Comparative Examples described below, all "parts" and "percents (%)" are by weight unless otherwise specified.

EXAMPLES 1 to 3 and COMPARATIVE EXAMPLES 1 to 5

By using 100 parts of polyol components having an average OH value of 380 to 410 as shown in Table 1 (PO=propylene oxide, EO =ethylene oxide), 1.5 to 4 parts of water and 25 to 46 parts of trichloromonofluoromethane as blowing agent, 2.4 parts of tetramethylhexammethylene diamine (KAO Lizer No. 1, trade name, mfd. by Kao Corp.) and 1.2 part of trimethylaminoethylpiperadine (KAO Lizer No. 8, mfd. by Kao Corp.) as catalyst, 2 parts of an organosilicon compound (L-5340 mfd. by Nippon Unikar Co.) as foam stabilizer, and necessary amounts of isocaynate components having an average NCO% of 31 to 33 (NCO/OH =1.10) shown in Table 1, foaming and curing were carried out to produce samples of rigid polyurethane foam.

EXAMPLES 4 to 6 and COMPARATIVE EXAMPLES 6 to 7

There were used 100 parts of polyol components having an average OH value of 380 to 410 as shown in Table 1, 1.5 to 4 parts of water and 30 to 52 parts of 1,1-dichloro-2,2,2-trifluoroethane (but 34 parts of 2,2-dichloro-2-monofluoroethane in Comparative Example 6 alone) as blowing agent, 2 parts of a 33% dipropylene glycol solution of triethylene diamine (TEDA-L 33 mfd. by TOSOH Corp.) and 0.5 part of pentamethyldiethylene triamine (KAO Lizer No. 3 mfd. by Kao Corp.) as catalyst, 2 parts of an organosilicon compound (L-5340 mfd. by Nippon Unikar Co.) as foam stabilizer, and necessary amounts of isocyanate components having an average NCO% of 31 to 33 (NCO/OH =1.10) shown in Table 1, and foaming and curing were carried out to produce samples of rigid polyurethane foam.

The results are shown in the section of "Properties" in Table 1.

In Table 1, the properties were determined as described below. Free foam density:

Density (kg/m$^3$) of the foam obtained by foaming in a mold of 200 × 200 × 200 mm in inside dimensions made of a veneer board. Panel foam density:

Density (kg/m$^3$) of the foam obtained by foaming in a mold of 400 × 600 × 35 mm in inside dimensions made of Al at mold temperature of 40° C.

Rate of low-temperature dimensional change:

The rate of change in thickness direction of a panel foam of 400 × 600 × 35 mm after standing at −20° C. for 24 hours.

Friability:

Measured according to the method of ASTM-C-421-61.

Friability is an item for evaluation for knowing "fragility" or brittleness of rigid polyurethane foams. The smaller the value of friability, the less is the surface wear, hence the better foam quality. Thermal conductivity:

Thermal conductivity of a panel foam of 200 × 200 × 50 mm was measured at an average temperature of 23.8° C. by using Anacon Model 88.

Compression strength:

Foam strength when a foam of 50 mm in diameter and 35 mm in thickness was compressed by 10%.

Mold release time:

The time from the beginning of pouring of a liquid composition into a mold till removal of the resulting foam from the mold.

Fluidity:

○ : Density difference in formula (1) is less than 10 kg/m$^3$.

Δ : Density difference in formula (1) is 10 to 12 kg/m$^3$.

x : Density difference in formula (1) is greater than 12 kg/m$^3$.

TABLE 1

|  |  | Comp. Example 1 | Comp. Example 2 | Comp. Example 3 | Comp. Example 4 | Example 1 | Example 2 | Example 3 |
|---|---|---|---|---|---|---|---|---|
| Polyol | Sucrose + PO/EO (%) | 6 | 6 | 50 | 50 | 50 | 50 | 50 |
|  | Propylene glycol + PO/EO (%) | 15 | 15 | 15 | 15 | 15 | 15 | 15 |
|  | Diethanolamine + PO (%) | 14 | 14 | 10 | 10 | 10 | 10 | 10 |
|  | Tolylene diamine + PO/EO (%) | 65 | 65 | 25 | 35 | 25 | 25 | 25 |
| Isocyanate | Polymethylene polyphenyl diisocyanate (%) | 100 | 100 | 100 | 60 | 70 | 80 | 90 |
|  | Sucrose tolylene diisocyanate prepolymer (%) | — | — | — | 40 | 30 | 20 | 10 |
| Blowing agent | Water (parts) | 1.5 | 3 | 3 | 2.5 | 2.5 | 3 | 3.5 |
|  | Trichloromonofluromethane (parts) | 46 | 33 | 33 | 37 | 37 | 33 | 25 |
|  | 1,1-Dichloro-2,2,2-trifluoroethane (parts) | — | — | — | — | — | — | — |
|  | 2,2-Dichloro-2-monofluoroethane (parts) | — | — | — | — | — | — | — |
| Properties | Free foam density (kg/m$^3$) | 21.5 | 21.3 | 20.0 | 19.0 | 19.2 | 19.2 | 20.7 |
|  | Panel foam density (kg/m$^3$) | 29.2 | 29.6 | 28.0 | 26.6 | 26.9 | 27.0 | 29.1 |
|  | Low-temperature dimensional change (%) | −0.5 | −0.5 | −2.0 | −0.6 | −0.6 | −0.5 | −0.5 |
|  | Friability (%) | 9 | 15 | 7 | 13 | 9 | 9 | 9 |
|  | Thermal conductivity (10$^{-3}$ kcal/m.h.°C.) | 13.5 | 14.2 | 14.0 | 13.7 | 13.5 | 13.8 | 14.2 |
|  | Compression strength (kg/cm$^2$) | 0.9 | 0.9 | 0.8 | 0.9 | 0.9 | 0.9 | 1.0 |
|  | Mold release time (min) | 5 | 8 | 6 | 7 | 4 | 4 | 5 |
|  | Fluidity | x | Δ | Δ | Δ | ○ | ○ | ○ |

|  |  | Comp. Example 5 | Comp. Example 6 | Example 4 | Example 5 | Comp. Example 7 | Example 6 |
|---|---|---|---|---|---|---|---|
| Polyol | Sucrose + PO/EO (%) | 50 | 50 | 50 | 50 | 50 | 50 |
|  | Propylene glycol + PO/EO (%) | 15 | 15 | 15 | 15 | 15 | 15 |

TABLE 1-continued

| | | | | | | | |
|---|---|---|---|---|---|---|---|
| | Diethanolamine + PO (%) | 10 | 10 | 10 | 10 | 10 | 10 |
| | Tolylene diamine + PO/EO (%) | 25 | 25 | 25 | 25 | 25 | 25 |
| Isocyanate | Polymethylene polyphenyl diisocyanate (%) | 90 | 80 | 80 | 80 | 80 | 80 |
| | Sucrose tolylene diisocyanate prepolymer (%) | 10 | 20 | 20 | 20 | 20 | 20 |
| Blowing agent | Water (parts) | 4 | 1.5 | 2 | 3 | 4 | 2 |
| | Trichloromonofluromethane (parts) | 20 | — | — | — | — | — |
| | 1,1-Dichloro-2,2,2-trifluoroethane (parts) | — | 52 | 47 | 38 | 30 | — |
| | 2,2-Dichloro-2-monofluoroethane (parts) | — | — | — | — | — | 34 |
| Properties | Free foam density (kg/m$^3$) | 21.3 | 21.0 | 20.5 | 20.0 | 20.4 | 20.1 |
| | Panel foam density (kg/m$^3$) | 29.9 | 29.3 | 29.0 | 28.1 | 28.9 | 28.7 |
| | Low-temperature dimensional change (%) | −0.4 | −1.8 | −0.7 | −0.6 | −0.6 | −0.6 |
| | Friability (%) | 13 | 7 | 8 | 8 | 10 | 8 |
| | Thermal conductivity (10$^{-3}$ kcal/m.h.°C.) | 15.3 | 13.5 | 13.8 | 14.3 | 15.6 | 13.6 |
| | Compression strength (kg/cm$^2$) | 1.0 | 0.6 | 0.9 | 0.9 | 0.9 | 0.9 |
| | Mold release time (min) | 5 | 6 | 5 | 5 | 5 | 5 |
| | Fluidity | x | x | o | o | x | o |

As seen from Table 1, Comparative Example 1 is a typical example of conventional polyurethane foams in which water and trichloromonofluoromethane are used as blowing agent and added to a conventional polyol composition. This product shows good properties except for fluidity. In Comparative Example 2, there are used the conventional polyol and isocyanate compositions, but the amount of water used in the blowing agent is increased to reduce the amount of trichloromonofluoromethane. In this example, as compared with Comparative Example 1, although the fluidity is improved, the friability is high and also the mold release time is long, indicating unsatisfactory properties of the foam of Comparative Example 2. Comparative Examples 3 and 4 are the cases where the polyol composition and the blowing agent employed are the same as used in the present invention, but the isocyanate components are outside the compositional range specified in the present invention. In Comparative Example 3, the rate of low-temperature dimensional stability is as large as −2.0 and also the fluidity is rather poor if not so bad. In Comparative Example 4, the friability is as high as 13, the mold release time is as long as 7 minutes, and the fluidity is also unsatisfactory.

In contrast, in Examples 1 to 3 where mixed polyol compositions and mixed isocyanate compositions defined in the present invention are used in combination, the thermal conductivity is 13.5 to 14.2 × 10$^{-3}$ kcal/m.hr.° C., which indicates that even if the amount of trichloromonoflucromethane in the blowing agent is reduced while increasing the amount of water within an appropriate range, (examples 1 and 2 show an almost same thermal conductivity as Comparative Example 1. Example 3 is somewhat inferior to Examples 1 and 2 in this respect but still meets the object of the present invention. It is further seen that Examples 1 to 3 are also excellent in other properties such as fluidity, low-temperature dimensional change, friability, compression strength and mold release time.

In Comparative Example 5 in which there are used the polyol and isocyanate compositions in the defined range of the present invention but the amount of water used in the blowing agent exceeds the specified range of the present invention, the friability is as high as 13 and the thermal conductivity is also markedly increased to 15.3 × 10$^{-3}$ kcal/m.hr.° C.

In Comparative Examples 6 and 7 and Examples 4 to 6, there are used the same polyol and isocyanate compositions as used in Example 2, and water and 1,1-dichloro-2,2,2-trifluoroethane (2,2-dichloro-2-monofluoroethane in Example 6) are used as blowing agent. Comparative Examples 6 and 7 are the cases where the amount of water used for the blowing agent is outside the specified range of 2 to 3.5 parts by weight according to the present invention as in the case of Comparative Example 5. In Comparative Example 6 in which the amount of water used is 1.5 parts which is below the above-specified range of the present invention, the rate of low-temperature dimensional change is as large as −1.8, and in Comparative Example 7 where the amount of water used is 4 parts which exceeds the defined range of the present invention, the thermal conductivity elevates to as high as 15.6 × 10$^{-3}$ kcal/m.hr.° C.

On the other hand, in Examples 4 to 6 where water was used within the range specified in the present invention, there were obtained as good a result as in Examples 1 to 3 described above.

Especially, as shown in Example 2, combination of the following mixed polyol composition and mixed isocyanate composition:

| | | |
|---|---|---|
| polyol: | sucrose + PO + EO | 50% |
| | propylene glycol + PO + EO | 15% |
| | diethanolamine + PO | 10% |
| | tolylene diamine + PO + EO | 25% |
| isocyanate: | polymethylene polyphenyl diisocyanate | 80% |
| | sucrose tolylene diisocyanate prepolymer | 20% | could produce a foam having the best balance of properties such as foam density (including both free foam density and panel foam density), thermal conductivity, low-temperature dimensional stability, friability, compression strength and mold releasing properties, even when using as blowing agent an increased amount of water while decreasing the amount of trichloromonofluoromethane, or when using water and 1,1-dichloro-2,2,2-trifluoroethane or 2,2-dichloro-2-monofluoroethane as blowing agent.

As shown in the above Examples, by using a mixture of a prescribed amount of water and one or more of specific organic chlorofluorine compounds as blowing agent and by further using the above-shown combination of mixed polyol and isocyanate compositions, it is possible to produce a rigid polyurethane foam having a low density (19 to 21 kg/m$^3$ in terms of free foam density) and a low thermal conductivity (15.0 × 10$^{-3}$ kcal/m.hr.° C., particularly 13.0 to 14.0 × 10$^{-3}$ kcal/m.hr.° C.) with good moldability. Further, such a rigid polyurethane foam can match the conventional products in property requirements (1% or less in the rate of low-temperature dimensional change, 0.9 kg/cm$^2$ or above in compression strength, and 5 minutes or less in mold release time).

EXAMPLE 7

FIG. 1 illustrates an example of application of the rigid polyurethane foam of this invention as a heat insulator used for constituting a wall of a building, casing of a reefer or the like. As shown in FIG. 1(a), a mixed solution containing the starting component materials for forming a rigid polyurethane foam such as used in Examples 1 to 6 is poured into a flat hollow casing 1 made of a metal such as aluminum from a pouring head 2, and the solution in the casing 1 is foamed and cured in the same manner as described above to form an insulating casing having a sectional shape shown in FIG. 1(b). FIG. 1(b) shows a section presented when the casing is cut along the line A—A' of FIG. 1(a). It is seen that the hollow portion of the casing is packed with the rigid polyurethane foam 4 formed in the manner described above. In performing pouring of said mixed solution into hollow casing 1, although not shown in the drawing, a plurality of similar hollow casings are arranged side by side in a thermostatic chamber kept at 35 to 45° C, and after a determined amount of said mixed solution has been poured into each casing, the pouring head 2 is closed. Opening 3 is a gas vent during the time when the mixed solution is being poured into the casing. It also serves as a gas vent during the foaming and curing operations. The thus obtained heat insulating casing can be effectively applied as a wall material for buildings such as houses, a heat insulator constituting the outer wall of a reefer and the like, and for other purposes for which the rigid polyurethane foams have been generally used.

EXAMPLE 8

FIG. 2 illustrates application of the rigid polyurethane foam of this invention as a heat insulator to be packed in an outer case of a refrigerator. The drawing shows schematically the way of packing the hollow portion of an outer case 21 of a refrigerator with the rigid polyurethane foam of this invention.

The procedure is as follows.
(1) The refrigerator outer case 1 is properly set in a foaming device (not shown) which has been heated to 35 to 45° C.
(2) A stock solution of rigid polyurethane foam, which has been adjusted to a temperature of 18 to 24° C., is poured into the case from the pouring heads 22.
(3) The solution poured into the case is foamed and fills up the outer case.
(4) The foam is after-cured and released from the mold after about 5 minutes.

In FIG. 2, arrows 25 indicate the direction of flow of rigid polyurethane foam, and numeral 23 denotes gas vents. The refrigerator outer case 21 is held inclined at an angle of 8 by taking into consideration the gas vents and the flowing direction of urethane foam. Thus, by using the same stock solution (mixed solution) for rigid polyurethane foam as used in Examples 1 to 6 and by performing foaming and curing in the same manner as described above, there can be produced a refrigerator outer case packed with a rigid polyurethane foam having the property values shown in Table 1.

In accordance with the present invention, as described above, it is possible to realize production of a rigid polyurethane foam having insulating properties well comparable with those of the conventional products and also having good fluidity by reducing, by 10 to 50%, or without using trichloromonofluoroethane which has been hitherto used as main blowing agent, and instead using HCFC, such as 1,1-dichloro-2,2,2-trifluoroethane or 2,2-dichloro-2-monofluoroethane, which are considered to have little effect on the destruction of ozone layer and not included in the list of compounds under regulation in use, with an adequate amount of water. Thus, the present invention has the effect of efficiently reducing or unnecessitating the use of trichloromonofluoromethane which is one of CFC's whose production and consumption are to be restricted in stages in the future and enabling obtainment of the products having as good performance and quality as the conventional ones.

What is claimed is:

1. A rigid polyurethane foam produced by reacting a polyol component with an isocyanate component in the presence of a blowing agent containing water, said polyol component being a mixed polyol composition comprising
   (a) 47 to 53% by weight of a polyol obtained by adding propylene oxide and/or ethylene oxide to sucrose,
   (b) 13 to 17% by weight of a polyol obtained by adding propylene oxide and/or ethylene oxide to propylene glycol,
   (c) 8 to 12% by weight of a polyol obtained by adding propylene oxide and/or ethylene oxide to diethanolamine, and
   (d) 23 to 27% by weight of a polyol obtained by adding propylene oxide and/or ethylene oxide to tolylene diamine, and said isocyanate component being a mixed isocyanate composition comprising
      (A) 70 to 90% by weight of polymethylene polyphenyl diisocyanate, and
      (B) 10 to 30% by weight of a sucrose tolylene diisocyanate prepolymer, the amount of water being 2 to 3.5% by weight per 100% by weight of polyol component.

2. A rigid polyurethane foam according to claim 1, wherein said mixed polyol composition has an average OH value of 380 to 410, and said mixed polyisocyanate composition has an average NCO% of 31 to 33.

3. A rigid polyurethane foam according to claim 1, wherein the ratio of NCO of said isocyanate component to OH of said polyol component, NCO/OH, is 1.00 to 1.2.

4. A rigid polyurethane foam according to claim 1, wherein there are used as said blowing agent at least one of organic chlorofluorine compounds selected from the group consisting of trichloromonofluoromethane, 1,1-dichloro-2,2,2-trifluoroethane, 2,2-dichloro-2-monofluoroethane and 2-monochloro-2,2-difluoroethane in an amount of 20 to 70 parts by weight and water in an amount of 2 to 3.5 parts by weight per 100 parts by weight of polyol component.

5. A rigid polyurethane foam according to claim 4, wherein the amount of trichloromonofluoromethane used is less than 40 parts by weight per 100 parts by weight of polyol component.

6. A rigid polyurethane foam according to claim 1, wherein said blowing agent comprises water in an amount of 2 to 3.5% by weight per 100% by weight of polyol component, and at least one of organic chlorofluorine type blowing agents selected from the group consisting of 1,1-dichloro-2,2,2-trifluoroethane, 2,2-dichloro-2-monofluoroethane and 2-monochloro-2,2-difluoroethane.

7. A process for producing a rigid polyurethane foam which comprises reacting a polyol component with an isocyanate component in the presence of a blowing agent, a reaction catalyst and a foam stabilizer, said blowing agent comprising water in an amount of 2 to 3.5% by weight per 100% by weight of said polyol component and at least one organic chlorofluorine type blowing agent, said polyol component being a mixed polyol composition comprising
  (a) 47 to 53% by weight of a polyol obtained by adding propylene oxide and ethylene oxide to sucrose,
  (b) 13 to 17% by weight of a polyol obtained by adding propylene oxide to propylene glycol,
  (c) 8 to 12% by weight of a polyol obtained by adding propylene oxide to diethanolamine, and
  (d) 23 to 27% by weight of a polyol obtained by adding propylene oxide and ethylene oxide to tolylene diamine, said mixed polyol composition having an average OH value of 380 to 410, and said isocyanate component being a mixed isocyanate composition comprising
    (A) 70 to 90% by weight of polymethylene polyphenyl diisocyanate, and
    (B) 10 to 30% by weight of a sucrose tolylene diisocyanate prepolymer-, said mixed isocyanate composition having an average NCO% of 31 to 33.

8. A process for using the rigid polyurethane foam of claim 1 as a heat insulator for a wall of a building or casing.

9. A process for using the rigid polyurethane foam of claim 1 as a heat insulator for refrigerators.

10. A composition for producing a rigid polyurethane foam comprising
  a polyol component comprising
    (a) 47 to 53% by weight of a polyol obtained by adding propylene oxide and/or ethylene oxide to sucrose,
    (b) 13 to 17% by weight of a polyol obtained by adding propylene oxide and/or ethylene oxide to propylene glycol,
    (c) 8 to 12% by weight of a polyol obtained by adding propylene oxide and/or ethylene oxide to diethanolamine, and
    (d) 23 to 27% by weight of a polyol obtained by adding propylene oxide and/or ethylene oxide to tolylene diamine,
  an isocyanate component comprising
    (A) 70 to 90% by weight of polymethylene polyphenyl diisocyanate, and
    (B) 10 to 30% by weight of a sucrose tolylene diisocyanate propolymer, and
  a blowing agent containing water, the amount of water being 2 top 3.5% by weight per 100% by weight of the polyol component.

11. A composition according to claim 10, wherein said blowing agent comprises water in an amount of 2 to 3.5% by weight per 100% by weight of polyol component, and at least one or organic chlorofluorine type blowing agents selected from the group consisting of 1,1-dichloro-2,2,2-trifluoroethane, 2,2-dichloro-2-monofluoroethane and 2-monochloro-2,2-difluoroethane.

* * * * *